(12) United States Patent
Kawazumi et al.

(10) Patent No.: US 8,499,880 B2
(45) Date of Patent: Aug. 6, 2013

(54) INTAKE CONFIGURATION FOR A VEHICLE

(75) Inventors: Takeji Kawazumi, Wako (JP); Yoshiaki Nakashima, Wako (JP); Shinya Iihoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 13/029,803

(22) Filed: Feb. 17, 2011

(65) Prior Publication Data

US 2011/0214933 A1 Sep. 8, 2011

(30) Foreign Application Priority Data

Mar. 2, 2010 (JP) ................................ 2010-045272

(51) Int. Cl.
*B60K 5/02* (2006.01)
*F02M 35/10* (2006.01)

(52) U.S. Cl.
USPC ...................................... 180/291; 123/184.21

(58) Field of Classification Search
USPC .................... 180/291, 292, 296; 123/184.21, 123/184.22, 184.57
See application file for complete search history.

(56) References Cited

U.S. PATENT DOCUMENTS

| | | | |
|---|---|---|---|
| 5,515,940 A * | 5/1996 | Shichinohe et al. | 180/376 |
| 7,665,566 B2 * | 2/2010 | Okada et al. | 180/291 |
| 2006/0027202 A1 * | 2/2006 | Yoshikawa et al. | 123/184.21 |
| 2006/0243250 A1 * | 11/2006 | Fukui | 123/432 |
| 2006/0273572 A1 * | 12/2006 | Yamamura | 280/834 |
| 2009/0013953 A1 * | 1/2009 | Fujita et al. | 123/184.21 |

FOREIGN PATENT DOCUMENTS

JP 2007-009829 A 1/2007

* cited by examiner

*Primary Examiner* — Frank Vanaman
(74) *Attorney, Agent, or Firm* — Squire Sanders (US) LLP

(57) ABSTRACT

A vehicle is provided that includes an intake device including a throttle body that is connected to a rear-side surface of a cylinder head which constitutes a part of an engine body which is mounted on a vehicle-body frame in a state where an axis of a crankshaft is arranged along the longitudinal direction. A sufficient clearance can be ensured between the intake device and a member which is arranged above the throttle body. A posture of the throttle body 30 is set such that an axis C2 of an intake passage formed in the throttle body 30 extends in the rearward and downward direction.

5 Claims, 6 Drawing Sheets

INTAKE CONFIGURATION FOR A VEHICLE

FIELD

Embodiments of the present invention relate to a vehicle in which an intake device including a throttle body is connected to a rear-side surface of a cylinder head which constitutes a part of an engine body mounted on a vehicle body frame with an axis of a crankshaft thereof arranged in the longitudinal direction.

BACKGROUND

For example, JP-A-2007-9829 describes a vehicle in which an intake device including a throttle body is connected to rear-side surface of a vertically-mounted engine body with an axis of a crankshaft thereof arranged in the longitudinal direction.

However, in the above-mentioned vehicle disclosed in JP-A-2007-9829, the throttle body is arranged such that an axis of an intake passage of the throttle body is inclined in the rearward and upward direction, and a height of the throttle body is elevated as an intake device extends in the rearward direction so that it is difficult to ensure a sufficient clearance between a member which is arranged above the intake device and the intake device.

SUMMARY

One embodiment of the present invention is directed to a vehicle in which an intake device including a throttle body is connected to a rear-side surface of a cylinder head which constitutes a part of an engine body which is mounted on a vehicle body frame with an axis of a crankshaft thereof arranged in the longitudinal direction. A posture of the throttle body is set such that an axis of an intake passage which is formed in the throttle body extends in the rearward and downward direction.

Another embodiment includes an injector which injects fuel toward an intake port of the cylinder head is mounted on an upper portion of the throttle body in a state where an injection axis of the injector is directed toward a curved outer peripheral side of the intake port.

In another embodiment, the intake port that is formed in the cylinder head of the engine body which has a cylinder axis thereof inclined toward either a left side or a right side is constituted of a common passage portion that opens on a rear-side surface of the cylinder head and a pair of branched passage portions that are branched from the common passage portion in a bifurcated manner such that the branched passage portions are individually communicated with a pair of intake valve ports formed in the cylinder head so as to open on a ceiling surface of a combustion chamber. An axis of the common passage portion is set in an offset manner toward an inclination side of the cylinder axis with respect to a plane which is arranged at the center between both intake valve ports and extends parallel to the cylinder axis. The throttle body is arranged such that a center axis of the throttle body which extends in the vertical direction is inclined in the same direction as the cylinder axis in conformity with the inclination of the cylinder axis, and an axis of the intake passage of the throttle body obliquely intersects with the axis of the common passage portion of the intake port.

Another embodiment includes a snorkel, which is arranged at the side of the throttle body in the lateral direction, and is connected to an air cleaner provided to an upstream end of the intake device. The throttle body is arranged in an inclined manner toward a side opposite to the snorkel in the lateral direction.

In another embodiment, a valve seat which forms the intake valve port therein is fixedly mounted on the cylinder head. The injection axis of the injector is set such that the injection axis intersects with the valve seat in a view projected onto a plane which includes the cylinder axis and is parallel to the injection axis.

Another embodiment includes a method. The method includes providing, by an engine body, motive force for the vehicle. The engine body is mounted on a vehicle body frame with an axis of a crankshaft arranged in a longitudinal direction. The method also includes providing air, by an intake device, to the engine body. The intake device includes a throttle body. The method further includes controlling, by the throttle body, an amount of the air provided to the engine body, connecting the intake device to a rear-side surface of a cylinder head which constitutes a part of the engine body, and setting a posture of the throttle body such that an axis of an intake passage which is formed in the throttle body extends in a rearward and downward direction.

DETAILED DESCRIPTION

One object of the present invention to provide a vehicle in which a sufficient clearance can be ensured between an intake device and a member which is arranged above the throttle body.

Figure 1:
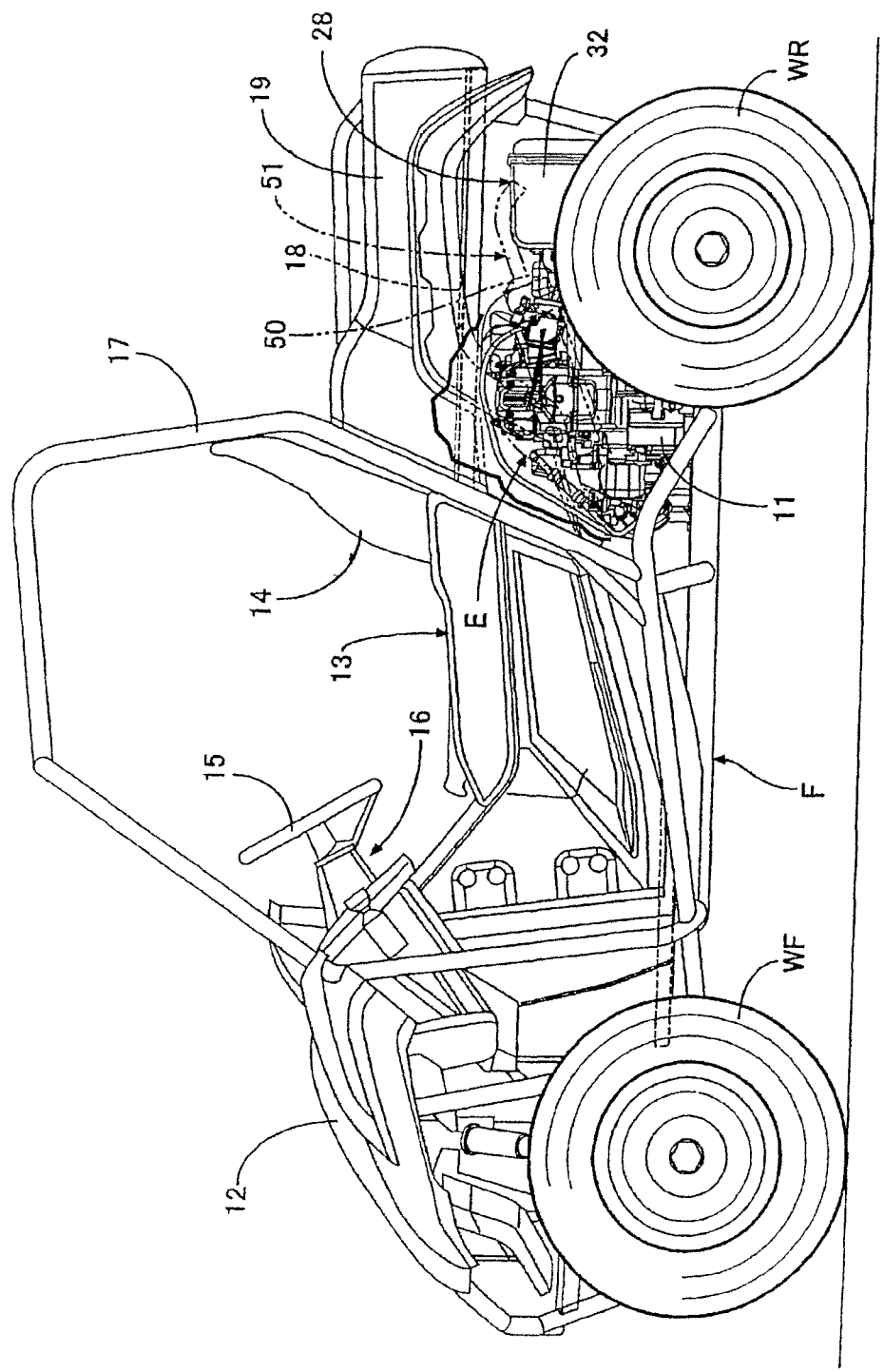
FIG. 1 illustrates a side view with a part broken away of a four-wheeled vehicle.

Hereinafter, embodiments of the present invention are explained in conjunction with FIG. 1 to FIG. 6. In FIG. 1, a vehicle body may include a pair of left and right front wheels WF that are pivotally and steerably supported on a front portion of a vehicle-body frame F. The vehicle body may also include pair of left and right rear wheels WR that are pivotally supported on a rear portion of the vehicle-body frame F. An engine body, which can include, for example, a crankcase 11 of an engine E can be mounted on a rear portion of the vehicle-body frame F in a state where a portion of the engine body 11 is arranged in front of the rear wheels WR as viewed in a side view.

A portion of the vehicle-body frame F and a portion of the engine E are covered with a vehicle-body cover 12. In one embodiment, the vehicle-body cover 12 integrally includes a cabin portion 13 which may be opened in the upward direction to allow an occupant to ride on the vehicle. The cabin portion 13 is arranged between the front wheels WF and the rear wheels WR. A pair of left and right seats 14 may be included in the cabin portion 13. A steering mechanism 16 which includes a steering handle 15 for steering the front wheels WF is mounted on the front portion of the vehicle-body frame F in a state where the steering mechanism 16 can be steered by an occupant sitting on one or both seats 14. A guard cover 17, which protects the cabin portion 13 from the front and rear sides as well as from above, may be mounted on the vehicle body frame F.

Further, in one embodiment, a carrier 18 is arranged above both rear wheels WR as viewed in a side view and side walls 19 that cover the carrier 18 from the front and rear sides and left and right sides are mounted on a rear portion of the vehicle-body cover 12. The carrier 18 and the side walls 19 may be arranged above the engine E.

Figure 2:
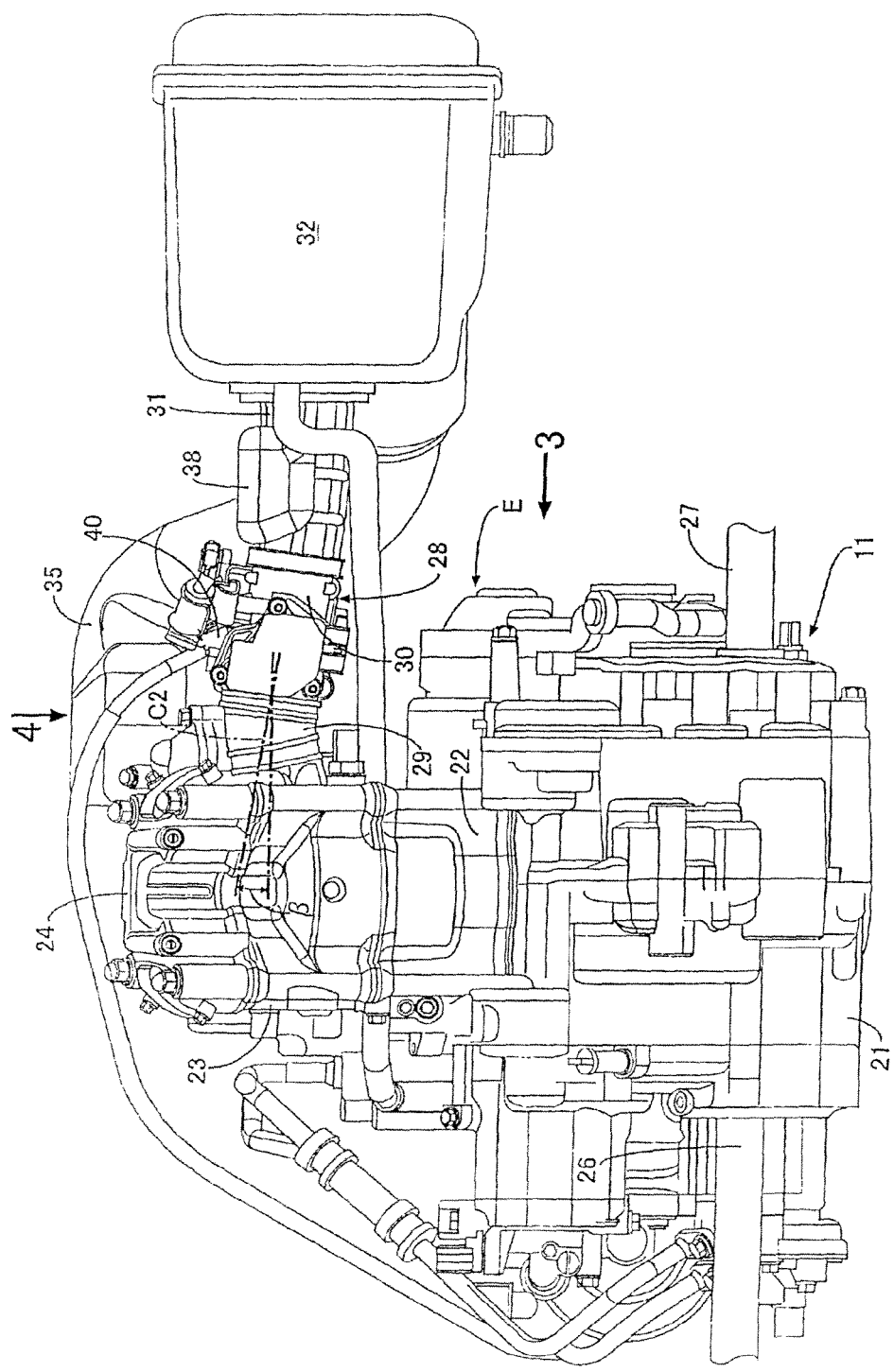
FIG. 2 illustrates a side view of an engine.
Figure 3:
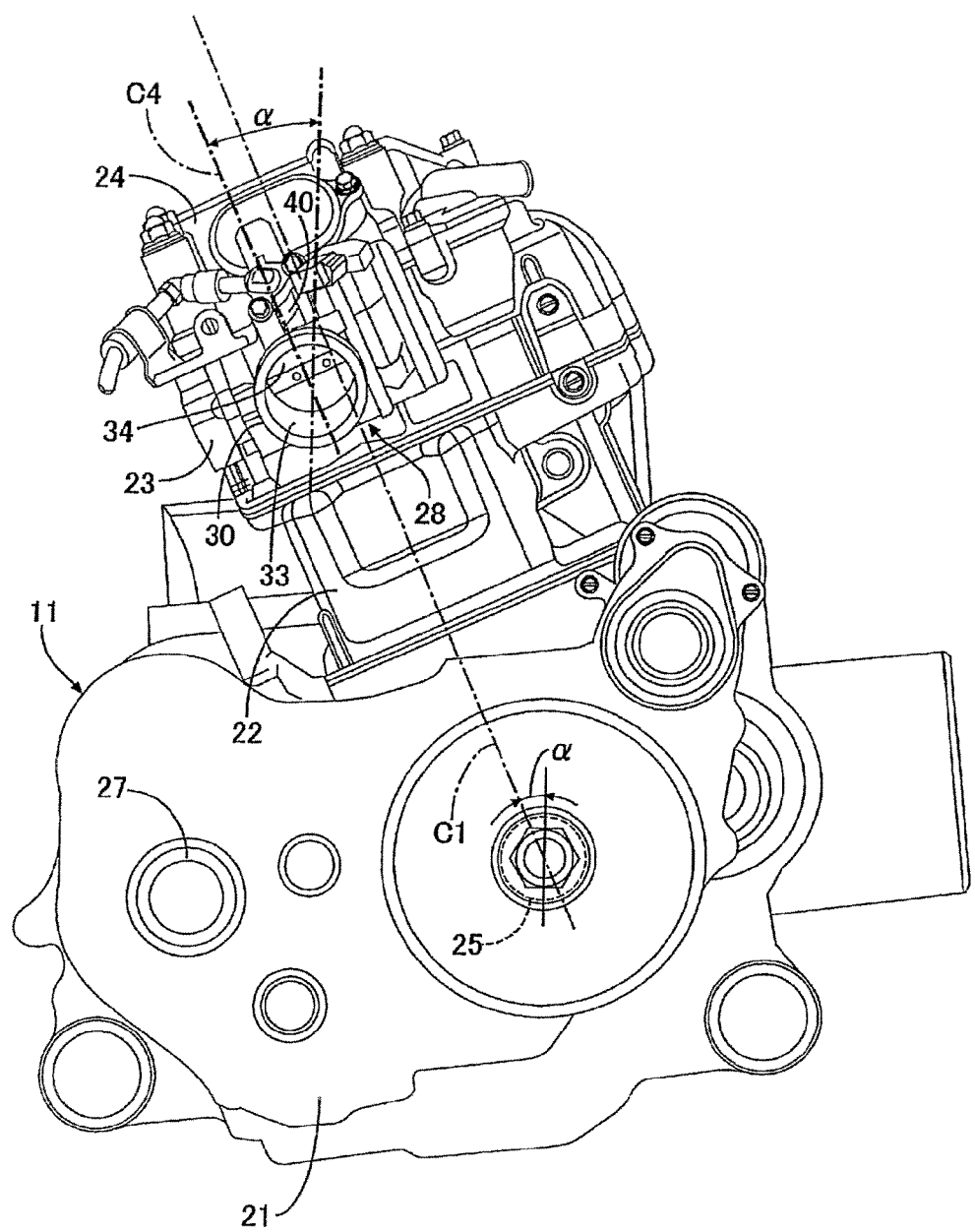
FIG. 3 illustrates a view of the engine as viewed in the direction indicated by an arrow 3 in FIG. 2 in a state where an air cleaner, a connecting tube and a snorkel are omitted.
Figure 4:
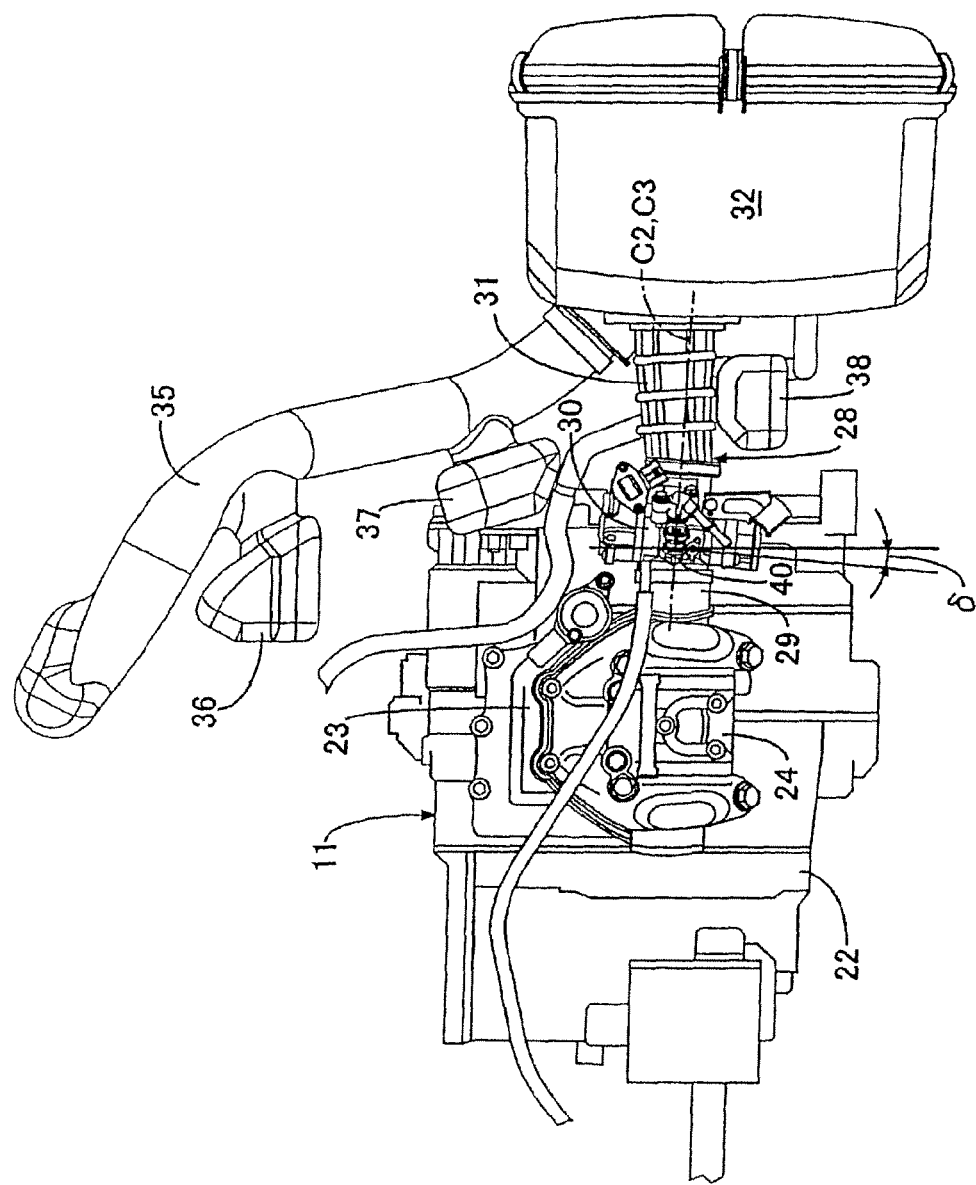
FIG. 4 illustrates a plan view of the engine as viewed in the direction indicated by an arrow 4 in FIG. 2.

In an embodiment, as depicted in FIGS. 2-4, the engine body 11 of the engine E includes a crankcase 21, a cylinder block 22 that is connected to an upper portion of the crankcase 21, a cylinder head 23 that is connected to an upper portion of the cylinder block 22, and a head cover 24 that is connected to an upper portion of the cylinder head 23. The engine body 11 may be mounted on the vehicle-body frame F in a vertically erected posture. That is, according to one embodiment, the engine body 11 is mounted on the vehicle-body frame F in a state where an axis of a crankshaft 25, which is rotatably supported on the crankcase 21, is arranged along the longitudinal direction. Power from the engine E is outputted from front and rear sides of the crankcase 21. The power from the engine E is transmitted to front and rear propeller shafts 26, 27 which have axes thereof arranged parallel to the crankshaft 25. Then, the power is transmitted to the pair of left and right front wheels WF from the front propeller shaft 26, and the power is transmitted to the pair of left and right rear wheels WR from the rear propeller shaft 27.

According to one embodiment, the engine body 11 is mounted on the vehicle-body frame F in a posture that a cylinder axis C1 of the engine body 11 is inclined toward either a left side or a right side. In this embodiment, as shown in FIG. 3, the engine body 11 is mounted on the vehicle-body frame F in a posture that the cylinder axis C1 is inclined to a left side by an angle α which, for example, is 17.5 degrees, according to one embodiment.

In an embodiment, an intake device 28 is connected to a rear-side surface of the cylinder head 23 in a state where the intake device 28 is arranged below the carrier 18 on the vehicle-body cover 12. The intake device 28 includes a throttle body 30 that is connected to the cylinder head 23 by way of an intake pipe 29 and an air cleaner 32 that is connected to the throttle body 30 by way of a connecting tube 31.

According to one embodiment, an intake passage 33 is formed in the throttle body 30, and a throttle valve for adjusting opening of the intake passage 33 is pivotally supported on the throttle body 30. The posture of the throttle body 30 can be set such that an axis C2 of the intake passage 33 is rearwardly and downwardly inclined by an angle β which may be 9 degrees, for example, with respect to a horizontal plane.

Further, a snorkel 35 may be arranged at the side of the throttle body 30 in the lateral direction and may be connected to the air cleaner 32 provided to an upstream end of the intake device 28 in a state where the snorkel 35 is arranged at the right side of the throttle body 30, for example, and extends in the frontward direction from the air cleaner 32. In one embodiment, the throttle body 30 is arranged in an inclined manner toward the side opposite to the snorkel 35 in the lateral direction, that is, toward the left side of the snorkel 35.

According to one embodiment, resonators 36, 37 are connected to a side wall of the snorkel 35, and a resonator 38 is connected to a side wall of the connecting tube 31.

Figure 5:
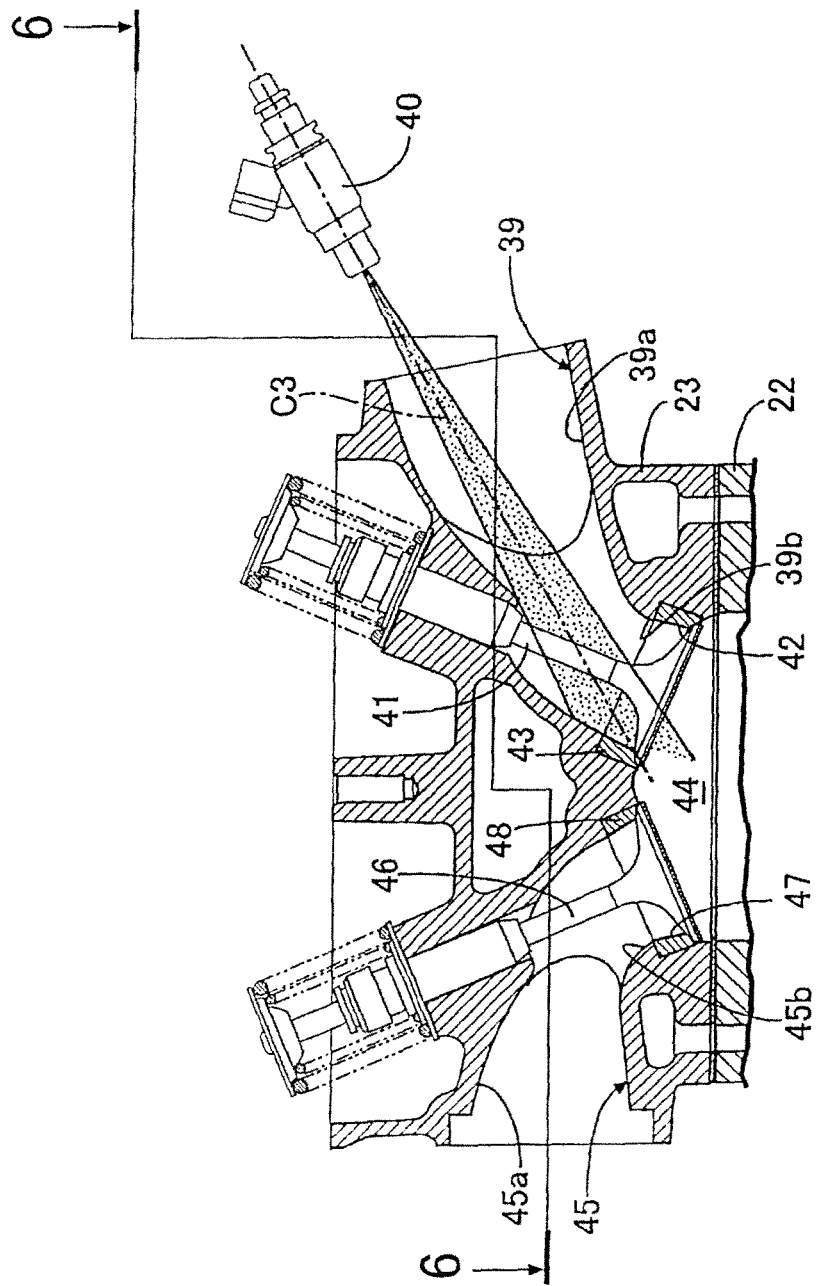
FIG. 5 illustrates a longitudinal cross-sectional view of an essential part of an engine body for showing the relative arrangement of an intake port and an injector.

In an embodiment illustrated in FIG. 5, an intake port 39 is formed in the cylinder head 23 such that the intake port 39 opens on a rear-side surface of the cylinder head 23, and the throttle body 30 is connected to the rear-side wall of the cylinder head 23 by way of the intake pipe 29 such that the intake passage 33 is communicated with the intake port 39. An injector 40 for injecting fuel into the intake port 39 may be mounted on an upper portion of the throttle body 30.

Further, according to one embodiment, the injector 40 is mounted on the upper portion of the throttle body 30 in a state where an injection axis C3 of the injector 40 is arranged along a plane that includes the axis C2 of the intake passage 33 and a center line C4 (see FIG. 3) of the throttle body 30 that extends in the vertical direction, and the injection axis C3 is directed toward a curved outer peripheral side of the intake port 39.

Figure 6:
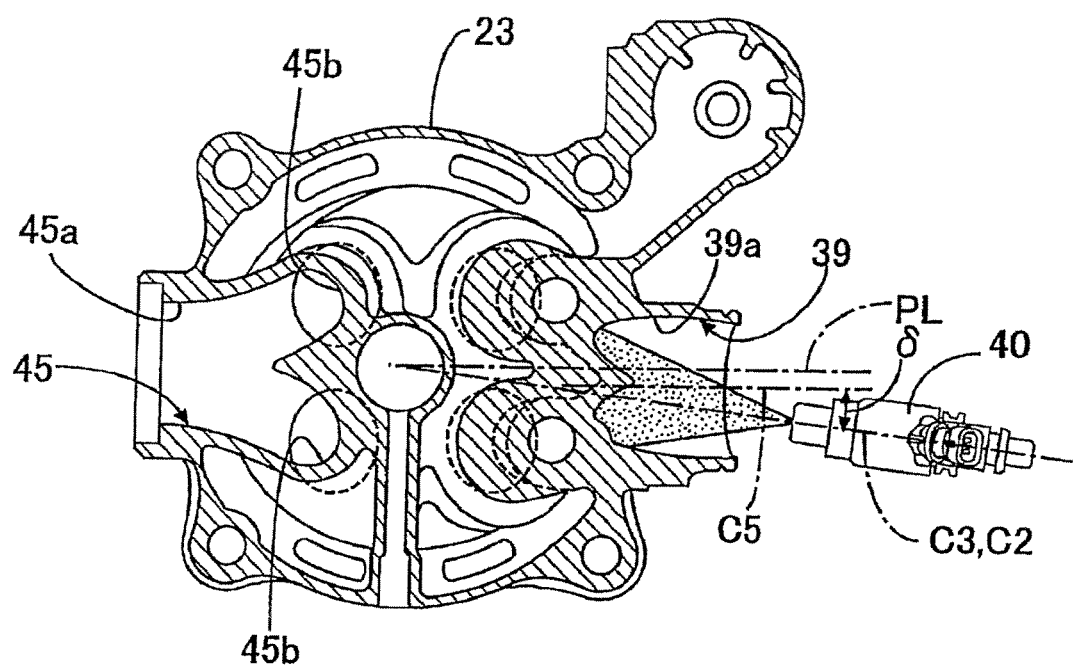
FIG. 6 illustrates a cross-sectional view of the engine body taken along a line 6-6 in FIG. 5.

According to an embodiment illustrated in FIG. 6, the intake port 39 includes a common passage portion 39a that opens on a rear-side surface of the cylinder head 23, and a pair of branched passage portions 39b that are branched from the common passage portion 39a in a bifurcated manner. Further, a pair of valve seats 43 which defines intake valve ports 42 therein are fixedly mounted on the cylinder head 23. The intake valve ports 42 open at a ceiling surface of the combustion chamber 44 in a state where the intake valve ports 42 are opened or closed by a pair of intake valves 41 that are arranged on the cylinder head 23 in an openable and closable manner. The branched passage portions 39b can communicate with both the intake valve ports 42 individually.

Further, according to an embodiment, the injection axis C3 of the injector 40 is mounted on the upper portion of the throttle body 30 and is set such that the injection axis C3 intersects with the valve seats 43 in a view projected onto (see FIG. 5) a plane which includes the cylinder axis C1 and is parallel to the injection axis C3.

Further, in one embodiment, an axis C5 of the common passage portion 39a of the intake port 39 is set in an offset manner toward the inclination side of the cylinder axis C1 with respect to a plane PL which is arranged at the center between both the intake valve ports and extends parallel to the cylinder axis C1. The throttle body 30 may be arranged such that the vertically-extending center line C4 of the throttle body 30 is inclined in the same direction as the cylinder axis C1 in conformity with the inclination of the cylinder axis C1, and the axis C2 of the intake passage 33 of the throttle body 30 obliquely intersects with the axis C5 of the common passage portion 39a of the intake port 39 by an angle δ which may be 4 degrees, for example.

Referring to the embodiments depicted in FIG. 5 and FIG. 6, an exhaust port 45 which opens on a front-side surface of the cylinder head 23 is formed in the cylinder head 23. The exhaust port 45 includes a common passage portion 45a which opens on the front-side surface of the cylinder head 23 and a pair of branched passage portions 45b which are branched from the common passage portion 45a in a bifurcated manner. Further, in one embodiment, a pair of valve seats 48 which defines exhaust valve ports 47 therein are fixedly mounted on the cylinder head 23. The exhaust valve ports 47 open at the ceiling surface of the combustion chamber 44 in a state where the exhaust valve ports 47 are opened or closed by a pair of exhaust valves 46 that are arranged on the cylinder head 23 in an openable and closable manner. The branched passage portions 45b can communicate with both the exhaust valve ports 47 individually.

Further, an exhaust device 51 is provided with an exhaust muffler 50 indicated by a chained line in FIG. 1 on a downstream end thereof. The exhaust device is connected to the exhaust port 45.

Next, the manner of operation of one embodiment is explained. The posture of the throttle body 30, which is provided to the intake device 28 connected to the rear-side surface of the cylinder head 23 that constitutes a part of the engine body 11, is set such that the axis C2 of the intake passage 33 formed in the throttle body 30 extends in the rearward and downward direction. Accordingly, a height of the intake device 28 can be reduced and hence, a member, such as the carrier 18 disposed above the throttle body 30, can be arranged in a space saving manner by ensuring a sufficient clearance between the throttle body 30 and the intake device 28.

The injector 40 which injects fuel toward the intake port 39 of the cylinder head 23 is mounted on the upper portion of the throttle body 30 in a state where the injection axis C3 of the injector 40 is directed toward the curved outer peripheral side of the intake port 39. Accordingly, fuel is injected into a region where a flow speed is fast in the distribution of the intake flow speed in the inside of the intake port 39 and hence, the atomization of the fuel is effectively accelerated.

Further, the engine body 11 is mounted on the vehicle-body frame F in a state where the cylinder axis C1 of the engine body 11 is inclined toward either a left side or a right side (in this embodiment, a left side). The intake port 39, which is formed in the cylinder head 23 of the engine body 11, is constituted of the common passage portion 39a which opens on the rear-side surface of the cylinder head 23 and the pair of branched passage portions 39b which is branched from the common passage portion 39a in a bifurcated manner in a state where the pair of branched passage portions 39b is individually communicated with the pair of intake valve ports 42 which is formed in the cylinder head 23 such that the pair of intake valve ports 42 opens on the ceiling surface of the combustion chamber 44. The axis C5 of the common passage portion 39a is set in an offset manner toward an inclination side of the cylinder axis C1 with respect to the plane PL which is arranged at the center between both the intake valve ports 42 and extends parallel to the cylinder axis C1. The throttle body 30 is arranged such that the vertically-extending center axis C4 of the throttle body 30 is inclined in the same direction as the cylinder axis C1 in conformity with the inclination of the cylinder axis C1, and the axis C2 of the intake passage 33 of the throttle body 30 obliquely intersects with the axis C5 of the common passage portion 39a of the intake port 39.

Accordingly, even when the axis C5 of the common passage portion 39a of the intake port 39 is set in an offset manner toward the inclination side of the cylinder axis C1 with respect to the plane PL which is arranged at the center between the pair of intake valve ports 42 and extends parallel to the cylinder axis C1, it is possible to uniformly inject fuel into both the intake valve ports 42 from the injector 40 mounted on the upper portion of the throttle body 30.

Further, the snorkel 35, which is arranged at the side of the throttle body 30 in the lateral direction, is connected to the air cleaner 32 provided to an upstream end of the intake device 28. The throttle body 30 is arranged in an inclined manner on a side opposite to the snorkel 35 in the lateral direction. Hence, it is possible to easily ensure a clearance between the snorkel 35 or the resonator 37 mounted on the snorkel 35 and the throttle body 30.

Further, the valve seats 43 in which the intake valve ports 42 are formed are fixedly mounted on the cylinder head 23. The injection axis C3 of the injector 40 is set such that the injection axis C3 intersects with the valve seats 43 in a view projected onto a plane which includes the cylinder axis C1 and is parallel to the injection axis C3. Accordingly, with respect to a fuel injection flow from the injector 40, a portion of the fuel injection flow on a combustion chamber 44 side from the injection axis C3 directly flows into the combustion chamber 44 from the intake valve ports 42. A portion of the fuel injection flow on a side opposite to the combustion chamber 44 from the injection axis C3 is injected into a region where a flow speed is high in the distribution of the intake flow speed in the inside of the intake port 39. Hence, it is possible to allow the fuel to reach the intake valve ports 42 while avoiding the adhesion of the fuel to the wall surface of the intake port 39 thus obtaining an excellent fuel injection.

Thus, according to one embodiment of the present invention, the posture of the throttle body is set such that the axis of the intake passage formed in the throttle body extends in the rearward and downward direction. As a result, the height of the intake device can be suppressed so that it is possible to arrange a member disposed above the throttle body such as an occupant's seat or a carrier in a space saving manner by ensuring a sufficient clearance between the member and the intake device.

According to another embodiment, fuel is injected toward the curved outer peripheral side of the intake port from the injector mounted on the upper portion of the throttle body. Thus, fuel is injected into a region where a flow speed is fast in the distribution of the intake flow speed in the inside of the intake port whereby the atomization of the fuel is effectively accelerated.

According to another embodiment of the present invention, even when the axis of the common passage portion of the intake port is set in an offset manner toward the inclination side of the cylinder axis with respect to the plane which is arranged at the center between the pair of intake valve ports and extends parallel to the cylinder axis, it is possible to uniformly inject fuel into both intake valve ports from the injector mounted on the upper portion of the throttle body.

Further, according to another embodiment, the snorkel that is arranged at the side of the throttle body in the lateral direction is connected to the air cleaner, and the throttle body is arranged in an inclined manner toward a side opposite to the snorkel in the lateral direction. As a result, it is possible to easily ensure a clearance between the snorkel or a resonator mounted on the snorkel and the throttle body.

Additionally, according to an embodiment of the present invention, the injection axis of the injector is set such that the injection axis intersects with the valve seat in the view projected onto the plane which includes the cylinder axis and is parallel to the injection axis. Accordingly, with respect to a fuel injection flow from the injector, a portion of the fuel injection flow on a combustion chamber side from the injection axis directly flows into the combustion chamber from the intake valve port, and a portion of the fuel injection flow on a side opposite to the combustion chamber with respect to the injection axis is injected into a region where a flow speed is high in the intake flow speed distribution in the inside of the intake port. Hence, it is possible to allow the fuel to reach the intake valve port while avoiding the adhesion of the fuel to a surface of the intake port thus obtaining an excellent fuel injection.

Although certain embodiments of the present invention have been explained above, the present invention is not limited to such embodiments and various design changes can be made without departing from the present invention described in the appended claims.

DESCRIPTION OF REFERENCE NUMERALS

11: engine body
23: cylinder head
25: crankshaft
28: intake device

30: throttle body
33: intake passage
32: air cleaner
35: snorkel
39: intake port
39a: common passage portion
39b: branched passage portion
40: injector
42: intake valve port
43: valve seat
44: combustion chamber
C1: cylinder axis
C2: axis of intake passage
C3: injection axis
C4: vertically-extending center line of throttle body
C5: axis of common passage portion
F: vehicle-body frame
PL: plane

We claim:

1. A vehicle, comprising:
    an engine body mounted on a vehicle body frame with an axis of a crankshaft arranged in a longitudinal direction;
    an intake device comprising a throttle body, wherein the intake device is connected to a rear-side surface of a cylinder head which constitutes a part of the engine body, and wherein a posture of the throttle body is set such that an axis of an intake passage which is formed in the throttle body extends in a rearward and downward direction;
    an injector configured to inject fuel toward an intake port of the cylinder head, wherein the injector is mounted on an upper portion of the throttle body in a state where an injection axis of the injector is directed to a curved outer peripheral side of the intake port,
    wherein the intake port is formed in the cylinder head of the engine body which has a cylinder axis thereof inclined toward either a left side or a right side,
    the intake port comprising a common passage portion configured to open on a rear-side surface of the cylinder head and a pair of branched passage portions that are branched from the common passage portion in a bifurcated manner such that the branched passage portions are individually communicated with a pair of intake valve ports formed in the cylinder head so as to open on a ceiling surface of a combustion chamber,
    wherein an axis of the common passage portion is set in an offset manner toward an inclination side of the cylinder axis with respect to a plane which is arranged at the center between both the intake valve ports and extends parallel to the cylinder axis, and
    wherein the throttle body is arranged such that a center axis of the throttle body which extends in the vertical direction is inclined in the same direction as the cylinder axis in conformity with the inclination of the cylinder axis, and an axis of the intake passage of the throttle body obliquely intersects with the axis of the common passage portion of the intake port.

2. The vehicle according to claim 1, further comprising a snorkel arranged at the side of the throttle body in the lateral direction, wherein the snorkel is connected to an air cleaner provided to an upstream end of the intake device, and wherein the throttle body is arranged in an inclined manner toward a side opposite to the snorkel in the lateral direction.

3. The vehicle according to claim 1, further comprising a valve seat configured to form the intake valve port therein, wherein the valve seat is fixedly mounted on the cylinder head, and wherein the injection axis of the injector is set such that the injection axis intersects with the valve seat in a view projected onto a plane which includes the cylinder axis and is parallel to the injection axis.

4. A vehicle, comprising:
    engine means for providing motive force for the vehicle, the engine means mounted on a vehicle body frame with an axis of a crankshaft arranged in a longitudinal direction;
    intake means for providing air to the engine means, the intake means comprising a throttle means for controlling an amount of air provided to the engine means, wherein the intake means is connected to a rear-side surface of a cylinder head which constitutes a part of the engine means, and wherein a posture of the throttle means is set such that an axis of an intake passage which is formed in the throttle means extends in a rearward and downward direction;
    injector means for injecting fuel toward an intake port of the cylinder head, wherein the injector means is mounted on an upper portion of the throttle means in a state where an injection axis of the injector means is directed to a curved outer peripheral side of the intake means,
    wherein the intake means is formed in the cylinder head of the engine means which has a cylinder axis thereof inclined toward either a left side or a right side,
    the intake means comprising a common passage portion configured to open on a rear-side surface of the cylinder head and a pair of branched passage portions that are branched from the common passage portion in a bifurcated manner such that the branched passage portions are individually communicated with a pair of intake valve ports formed in the cylinder head so as to open on a ceiling surface of a combustion chamber,
    wherein an axis of the common passage portion is set in an offset manner toward an inclination side of the cylinder axis with respect to a plane which is arranged at the center between both the intake valve ports and extends parallel to the cylinder axis, and
    wherein the throttle means is arranged such that a center axis of the throttle means which extends in the vertical direction is inclined in the same direction as the cylinder axis in conformity with the inclination of the cylinder axis, and an axis of the intake means of the throttle means obliquely intersects with the axis of the common passage portion of the intake means.

5. A method, comprising:
    providing, by an engine body, motive force for the vehicle, the engine body mounted on a vehicle body frame with an axis of a crankshaft arranged in a longitudinal direction;
    providing air, by an intake device, to the engine body, the intake device comprising a throttle body;
    controlling, by the throttle body, an amount of the air provided to the engine body;
    connecting the intake device to a rear-side surface of a cylinder head which constitutes a part of the engine body; and
    setting a posture of the throttle body such that an axis of an intake passage which is formed in the throttle body extends in a rearward and downward direction,
    injecting, by an injector, fuel toward an intake port of the cylinder head, wherein the injector is mounted on an upper portion of the throttle body in a state where an injection axis of the injector is directed to a curved outer peripheral side of the intake port, wherein the intake port is formed in the cylinder head of the engine body which has a cylinder axis thereof inclined toward either a left side or a right side, the intake port comprising a common passage portion configured to open on a rear-side surface of the cylinder head and a pair of branched passage portions that are branched from the common passage portion in a bifurcated manner such that the branched passage portions are individually communicated with a pair of intake valve ports formed in the cylinder head so as to open on a ceiling surface of a combustion chamber, wherein an axis of the common passage portion is set in an offset manner toward an inclination side of the cylinder axis with respect to a plane which is arranged at the center between both the intake valve ports and extends parallel to the cylinder axis, and wherein the throttle body is arranged such that a center axis of the throttle body which extends in the vertical direction is inclined in the same direction as the cylinder axis in conformity with the inclination of the cylinder axis, and an axis of the intake passage of the throttle body obliquely intersects with the axis of the common passage portion of the intake port.

* * * * *